UNITED STATES PATENT OFFICE.

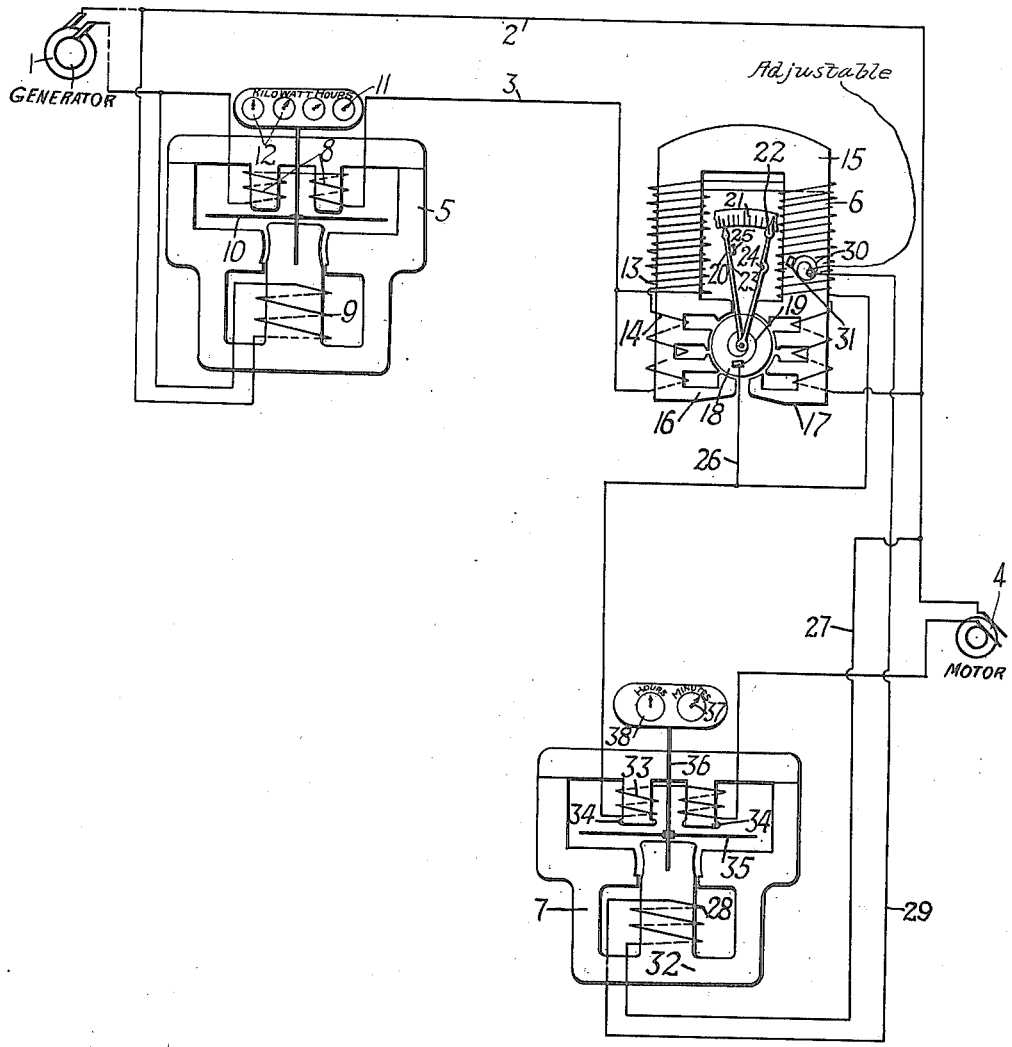

CLAXTON E. ALLEN, OF PITTSBURGH, AND EDWARD M. FAY, OF WILKINSBURG, PENNSYLVANIA, ASSIGNORS TO WESTINGHOUSE ELECTRIC AND MANUFACTURING COMPANY, A CORPORATION OF PENNSYLVANIA.

MAXIMUM-DEMAND METER.

1,206,284.   Specification of Letters Patent.   Patented Nov. 28, 1916.

Application filed March 28, 1913. Serial No. 757,356.

*To all whom it may concern:*

Be it known that we, CLAXTON E. ALLEN and EDWARD M. FAY, citizens of the United States, and residents, respectively, of Pittsburgh and Wilkinsburg, in the county of Allegheny and State of Pennsylvania, have invented a new and useful Improvement in Maximum-Demand Meters, of which the following is a specification.

Our invention relates to meters and metering systems and particularly to improvements in the same, whereby facilities are provided for determining the power demands of a consumer. This information is important in order to fix the penalties to be imposed upon the consumer and for carrying out stipulated terms in agreements between the buyer and seller of power.

One object of our invention is to provide means in a power circuit whereby the time integral of power traversing the said circuit, the instantaneous value of power demanded, the maximum instantaneous value of power demanded over an interval of time, and either the total time of the demand for power above a predetermined instantaneous value, or the total power consumed in excess of a predetermined instantaneous value, can be simultaneously ascertained.

For a better understanding of the nature, the characteristic features and the scope of our invention, reference may be had to the following description and to the accompanying drawing the single figure of which is a diagrammatic view of a power circuit embodying a form of our invention.

A power generator 1 delivers energy through conductors 2 and 3, to a receiving apparatus here represented by a motor 4 which may be remote from said generator. In circuit with the generator 1 is an integrating wattmeter 5, an indicating demand meter 6 and a device 7, which may be used either as a means for measuring time or as an integrating wattmeter.

The device 5 is a standard form of a watthour meter, which measures the total power consumed in the receiving circuit, said watthour meter comprising current coils 8, a voltage coil 9, electric, magnetic and mechanical parts so arranged that the meter is operative during the time of the flow of power from the generator to the receiver. When power is demanded by the receiving circuit or motor 4, the disk 10 of the meter 5 rotates, and, by means of a gear train (not shown) and indicators 11, it registers upon dials 12, the total power consumed in the receiving circuit during an interval of time.

With connections to the power circuit as shown in the drawing, the demand indicator 6 comprises a current coil 13 and a voltage coil 14, which are so disposed upon a magnetically inductive core 15 that a shifting magnetic flux is produced between poles 16 and 17, thereby causing torque to be exerted upon a rotatable member 18 which is located between the poles 16 and 17. In opposition to the torque imposed upon the member 18 by reason of the magnetizing action of the poles 16 and 17, is a torque produced by a spiral spring 19, the resultant effect upon the member 18 being a rotary displacement of the member about its central axis. Rigidly mounted upon the drum 18 is an indicator 20, which moves over the dial 21 having a scale marked upon it and being so calibrated that, in coöperation with the indicator 20, the instantaneous value of power demanded in the receiving circuit may be ascertained.

Rotatably mounted upon the bearings of the movable member 18, but having no mechanical connection thereto, is an indicator 22. By means of a finger 23, on the indicator 20 and a lateral recess 24 formed upon the indicator 22, both indicators become operatively engaged when the demand for power exceeds a value in excess of that predetermined by the position of the indicator 22 upon the dial 21. The mutual engagement of the indicators continues for increasing demands of power, when the demands require amounts whose values are in that region of the scale in excess of the predetermined instantaneous value of power. On decreasing demands of power, the indicator 20 becomes disengaged from the indicator 22 and recedes to the lower end of the scale, while the indicator 22 remains at that position on the scale attained before disengagement, which position indicates the maximum instantaneous value of power that has been demanded up to the time of disengagement.

Upon the indicator 20 is mounted an electrical contact piece 25 which is connected to one side of the transmission line through a conductor 26, the spiral spring 19 and the indicator 20. The other side of the transmission line is connected, through a conductor 27, a voltage coil 28 of the device 7, a conductor 29 and a spiral spring 30, to a contact piece 31. When the indicator 20 advances to that position on the scale which represents the predetermined value of the maximum power demand, the contacts 25 and 31 come into engagement and thereby close the circuit through the voltage coil 28 of the device 7. This engagement between the contacts 25 and 31 continues during the time of all demands for power in excess of the predetermined value of the maximum power demand. The value of power at which this circuit is closed through the voltage coil 28 is dependent upon the position of the contact 31, which may be adjusted to correspond to any value on the scale 21.

The device 7, herein represented as a timing meter, comprises a voltage coil 28 upon a core 32, a current coil 33 embracing poles 34, a rotatable disk 35 rigidly connected to a shaft 36, which, through a gear train (not shown) registers time by means of indicators 37 upon dials 38. During the demand for power in the receiving circuit, current flows through the current coil 33 and through the voltage coil 28 only during the time of engagement of the contacts 25 and 31 of the demand indicator 6. The relations between the magnetic and electrical parts of the timing device 7 are such that the magnetic circuit is supersaturated during the flow of current through the coil 28, thus exerting upon the rotatable disk 35 a constant torque, irrespective of the amount of power demanded in the receiving circuit. Thus, when the coils 28 and 33 have current flowing through them simultaneously, the disk 35 rotates at a constant speed and registers time upon the dials 38, which are calibrated in hours and minutes.

A modification of the device 7 is that of having it register power in watthours which is effected by so modifying the magnetic and electric relations in said device that the torque upon the disk 35 varies with the power demanded in the receiving circuit, thus causing the registration of power on the dials 38. Acting as a watthour meter, the device 7 becomes operative when the demand for power in the receiving circuit is in excess of the predetermined instantaneous value, which value is dependent upon the power demand when the contacts 25 and 31 come into electrical contact.

Our invention may be embodied in other combinations and forms than the one described, and we therefore do not wish to limit ourselves to the precise arrangement disclosed.

We claim as our invention:

1. In a measuring system, the combination with a maximum-demand wattmeter and contact members actuated thereby, of means controlled by the contact members for registering the total amount of energy when the maximum demand has a predetermined value.

2. In a measuring system, the combination with a maximum-demand indicating wattmeter having coöperating contact members thereon that are adapted to engage when the maximum demand has a predetermined value, of means controlled by the contact members for registering the total energy consumed when the contact members are engaged.

3. In a measuring system, the combination with an indicating wattmeter having a maximum-demand indicator and coöperating contact members attached thereto, of an electro-responsive device controlled by the said contact members to register the energy consumed when the contact members are engaged.

4. In a measuring system, the combination with a maximum-demand indicating wattmeter and contact members operatively connected thereto, of means controlled by the said contact members for registering only when the contact members are engaged.

5. In a measuring system, the combination with an indicating wattmeter, of electro-responsive means having windings that are adapted to be controlled by the indicating wattmeter for registering the total amount of energy when the demand is in excess of a predetermined instantaneous value.

6. In a measuring system, the combination with an indicating wattmeter having a maximum-demand indicator and coöperating contact members attached thereto, of an electro-responsive device controlled by the said contact members to register only when the contact members are engaged.

7. In a measuring system, the combination with a wattmeter having a pointer for indicating the power demand, of electro-responsive means having windings so controlled by the wattmeter that the latter registers the total amount of energy when the power demand is in excess of a predetermined value only.

8. The combination with a wattmeter for indicating the power demand and a watthour meter having windings so controlled by the wattmeter that the latter registers the total amount of energy when the power demand is in excess of a predetermined value only.

9. In a measuring system, the combination with an indicating wattmeter having a pointer, a contact member mounted upon the pointer, and a resiliently mounted adjustable contact member adapted to coöperate with the contact member that is mounted upon the pointer, of an electro-responsive device controlled by the said contact members to register the energy when the contact members are engaged.

In testimony whereof, we have hereunto subscribed our names this 22nd day of March, 1913.

CLAXTON E. ALLEN.
EDWARD M. FAY.

Witnesses:
EDITH C. REVELLS,
B. B. HINES.